US006634846B1

(12) United States Patent
Enenkel et al.

(10) Patent No.: US 6,634,846 B1
(45) Date of Patent: Oct. 21, 2003

(54) METHOD AND DEVICE FOR UNLOADING A POSTAL CONTAINER THAT HAS AN OPEN TOP

(75) Inventors: Peter Enenkel, Constance (DE); Armin Zimmermann, Constance (DE); Dirk Nolte, Offenburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/913,104

(22) PCT Filed: Feb. 1, 2000

(86) PCT No.: PCT/DE00/00268

§ 371 (c)(1), (2), (4) Date: Aug. 9, 2001

(87) PCT Pub. No.: WO00/47341

PCT Pub. Date: Aug. 17, 2000

(30) Foreign Application Priority Data

Feb. 12, 1999 (DE) ........................................ 199 05 955

(51) Int. Cl.[7] ................................................ B65G 65/23

(52) U.S. Cl. .................. 414/416.06; 414/419; 414/420; 414/416.01

(58) Field of Search ................................ 414/425, 420, 414/419, 416.01, 416.06

(56) References Cited

FOREIGN PATENT DOCUMENTS

| | | | |
|---|---|---|---|
| DE | 26 56 619 | | 7/1977 |
| DE | 41 17 434 | A1 | 12/1992 |
| DE | 691 10 829 | T2 | 11/1995 |
| DE | 195 45 716 | C1 | 9/1996 |
| EP | 464771 | * | 1/1992 |
| EP | 716891 | * | 6/1996 |
| FR | 2680121 | * | 2/1993 |
| WO | WO 98/23393 | | 11/1997 |

* cited by examiner

*Primary Examiner*—Steven A. Bratlie
(74) *Attorney, Agent, or Firm*—Philip G. Meyers

(57) ABSTRACT

The invention concerns a process and a device for unloading a mail piece container, open at the top, with sidewalls that slant toward the outside, that is loaded with mail pieces that stand upright next to one another. According to the invention, the mail piece stack, after having been compressed, is held by holding supports that are inserted into the container and that feature driven revolving conveyor bands. While the supports are being inserted, the conveyor bands are driven in such a way that the conveyor band segments in contact with the mail piece stack are motionless with respect to the mail pieces. Next, the container is tilted by >90° along with the mail pieces and the holding supports. After the container is tilted back somewhat, a base plate is inserted and the whole ensemble is tilted back to the point where the stack stands on the horizontally positioned base plate. Then the container is removed towards the bottom.

6 Claims, 2 Drawing Sheets

METHOD AND DEVICE FOR UNLOADING A POSTAL CONTAINER THAT HAS AN OPEN TOP

TECHNICAL FIELD

The invention concerns processes and a device for unloading a mail piece container of the type having side walls slanting toward the outside, loaded with mail pieces that stand on edge next to one another, and exhibiting gripping recesses in its opposite smaller sides.

BACKGROUND OF THE INVENTION

In mail piece distribution processes, slim mail pieces, letters for example, are transported in corresponding containers. To sort the mail pieces according to the recipients' addresses in sorting apparatuses, the containers must be unloaded and the pieces fed to a material input. The unloading and feeding were accomplished manually in the past. Although a solution for the automatic feeding of sorting machine material inputs was described in DE 195 45 716 C1, the full container is, however, dumped forcefully on the material input. A gentle transition of the aligned mail piece stack, without danger of damage to the individual mail pieces, is not possible with this prior art. If it is also necessary to maintain the arrangement of the edges, then the stack must be turned back again. The edge arrangement necessary for further processing is not guaranteed using these processes.

It is thus the task of the invention, through utilization of a process, to make possible semi-automated or fully automated emptying of mail piece containers, of the type that are open at the top and have side walls that slant toward the outside, so that the mail pieces are unloaded gently, maintaining their orientation and arrangement.

SUMMARY OF THE INVENTION

This task is solved according to the invention through the steps of: (1) the mail piece container is taken up by a holding and positioning device that can be tilted, (2) compression of the mail piece stack within the horizontally aligned mail piece container having pressing elements that are movable horizontally through the gripping recesses, (3) engagement of the tilting and movable holding supports next to the pressing elements from above, in order to hold the mail piece stack in compressed form, with the conveyor bands of the holding supports being driven in such a way that the segments of the conveyor band in contact with the mail pieces are motionless with respect to the mail pieces, (4) removal of the pressing elements from the mail piece container, (5) tilting of the full mail piece container with the holding supports by >90° around a longitudinal axis to the point that the mail piece stack can rest on the now lower side of the mail piece container, (6) tilting back of the mail piece container to the point that a movable and tiltable base plate can be inserted between the mail piece container and the mail piece stack, (7) insertion of the base plate between the mail piece container and the mail piece stack, (8) tilting back of the mail piece container, the base plate, and the mail piece stack—which is clamped between the holding supports—to a horizontal position of the mail piece stack, while maintaining the positions of these elements with respect to one another and (9) detaching of the mail piece container from the holding and positioning device and removal of the mail piece container.

A corresponding device for unloading a mail piece container open at the top with side walls that slant toward the outside, which container is loaded with mail pieces that stand upright next to one another, and which container exhibits gripping recesses on its opposite narrow sides, is characterized by (1) horizontally movable pressing elements for compressing the mail piece stack, in a horizontal base position of the mail piece container, through the gripping recesses; (2) movable holding supports that can be tilted, having conveyor belts that can be driven, that take over the compressed mail piece stack in the container and hold it; (3) a holding and positioning device, which can be tilted, for the mail piece container; (4) a base plate that can be, tilted and moved; and (5) a control unit, as well as sensors, for realizing the process steps set forth above.

The mail pieces are unloaded through the indicated steps and means such that the aligned condition of the mail pieces is maintained and such that no forces occur that unsettle or crumple the mail pieces. In order to achieve this, during unloading, the stack is transported, compressed and clamped between holding supports with revolving conveyor bands. When the holding supports are engaged, the conveyor bands are moved so that no additional forces, besides the normal forces, act on the contacted mail pieces.

The tilting and translational movements are effected by means of a conventional and familiar handling system with numerically controlled axes, and is thus not represented in more detail here.

BRIEF DESCRIPTION OF THE DRAWINGS

The invention is more closely explained in the following, using illustrations of an embodiment wherein.

DETAILED DESCRIPTION

Figure 1A:
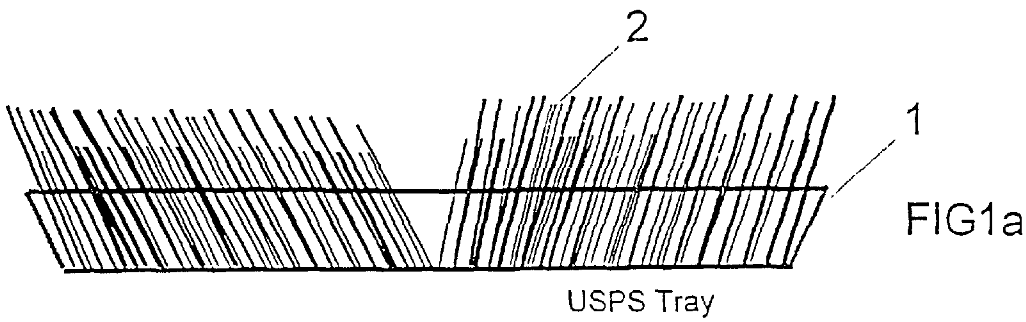
FIG. 1*a*, a schematic side view of a standing mail piece container loaded with mail pieces.
Figure 1B:
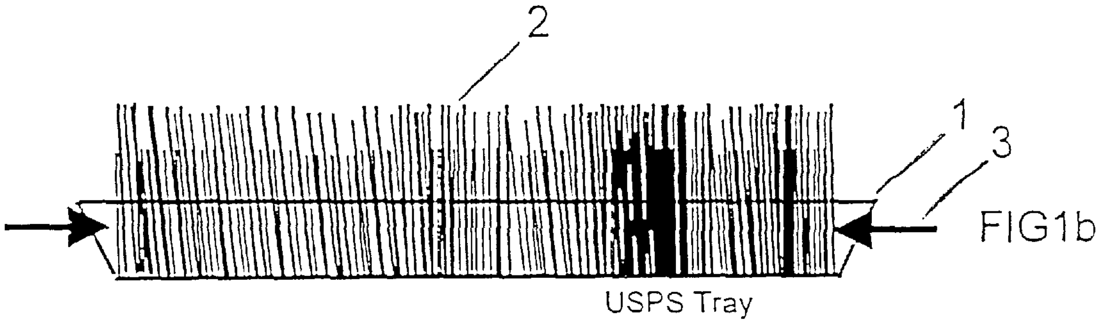
FIG. 1*b*, a schematic side view of the mail piece container with the mail piece stack compressed.

In FIG. 1*a* mail piece container 1 is presented in see-through representation with sidewalls that slant toward the outside. It is loaded with a loose stack 2 of mail pieces that are standing upright. First, according to FIG. 1*b*, by pushing through the gripping recesses against the sides of the mail pieces, using pressing elements, not represented in greater detail, that are pressed against the mail pieces, compression of the mail piece stack occurs (indicated by arrows 3). Here, if desired, the pressures can also be measured, to maintain a fixed compression pressure. The mail piece container is, in this arrangement, fixed in a not-represented holding and positioning device.

Next, holding supports 4 are brought into the free space between the stack and the container sidewall against mail piece stack 2. During this downward movement of holding supports 4 the revolving conveyor bands are driven in such a way that the band segments in contact with the mail pieces are motionless with respect to them. In this way, damaging stresses from holding supports 4 are avoided. Holding supports 4 and the pressing elements are arranged with respect to one another such that they do not impede each other while holding mail piece stack 1.

Figure 1C:
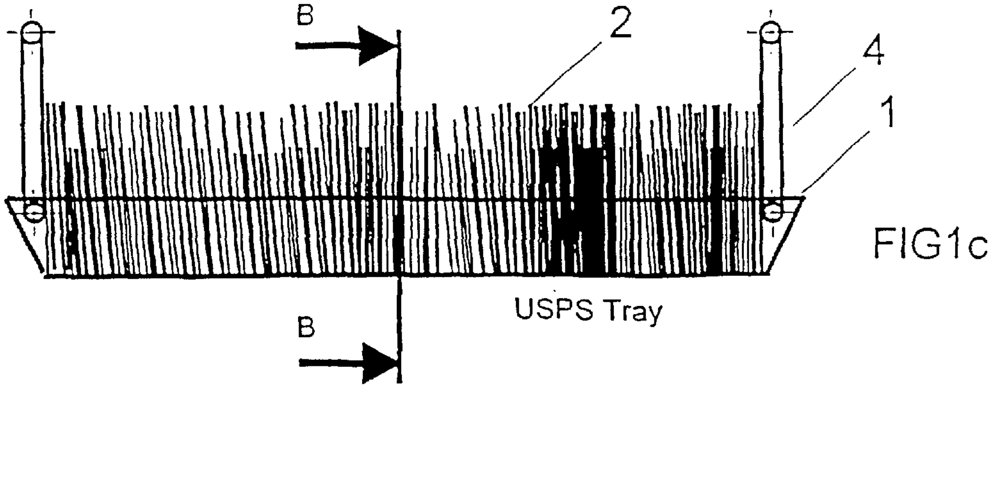
FIG. 1*c*, a schematic side view of the mail piece container with the compressed mail piece stack held between holding supports with conveyor bands, and FIGS. 2*a–e*, a schematic representation, along section B—B of FIG. 1*c*, of consecutively occurring processes during unloading of the mail piece container.

When mail piece stack 2 is also clamped between holding supports 4, then the pressing elements are removed (FIG. 1*c*).

In the following FIGS. 2*a–e*, the remaining process, viewed in section B—B, is explained.

Figure 2A:
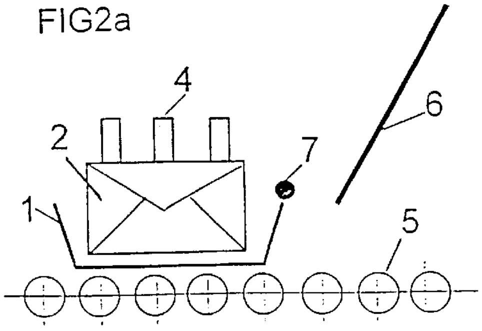
Figure 2B:
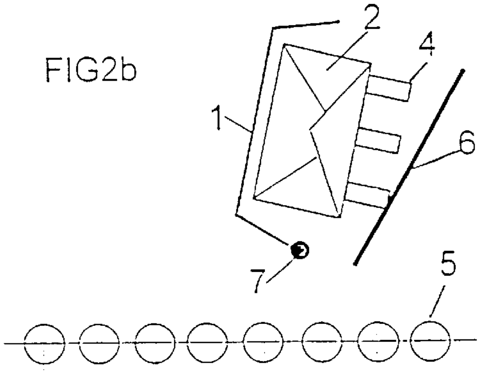

FIG. 2*a* once again shows the circumstances that accord with FIG. 1*c*. As can be recognized, mail piece container 1 has been transported to this point on transport conveyor 5, embodied as a roller conveyor. Holding supports 4 each have three conveyor bands. The holding and positioning device for mail piece container 1 is not represented because of the perspective. Pivot point 7 in a longitudinal axis is indicated, however, and the holding and positioning device, with mail piece container 1 and the mail pieces, can be tilted around it. Further, movable check wall 6, whose function will be explained, can be recognized. According to FIG. 2*b*, mail piece container 1—along with mail piece stack 2 and holding supports 4—is tilted approximately 95°. Thus it is ensured that, if mail pieces should come out of the stack, they will rest against the container wall now positioned at the bottom. Because the tilting action covers a little more than 90°, a small force component exists that prevents the mail piece stack from moving with the container when it is tilted back, and a large force component exists that acts on the second aligned edge. Next, mail piece container 1 is tilted back just far enough that a gap exists between mail piece stack 2 and mail piece container 1, and that base plate 8 can reach into this gap from the free end of mail piece stack 2.

Figure 2C:
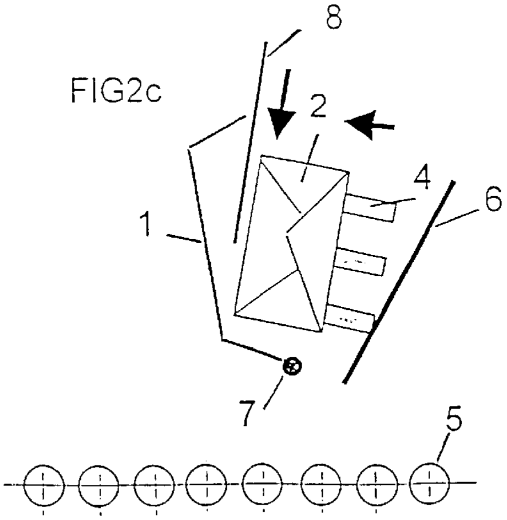

In addition, check wall 6 is brought to the other longitudinal side of mail piece stack 2, as a safeguard to prevent an especially unstable mail piece stack 2 from coming loose on that side—in the case of especially great differences in the mail pieces' sizes and breadths, for example (FIG. 2*c*).

Figure 2D:
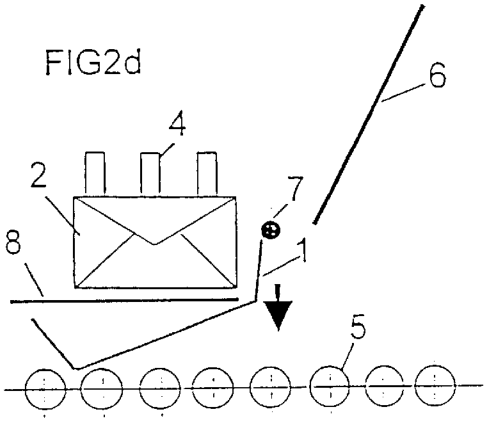
Figure 2E:
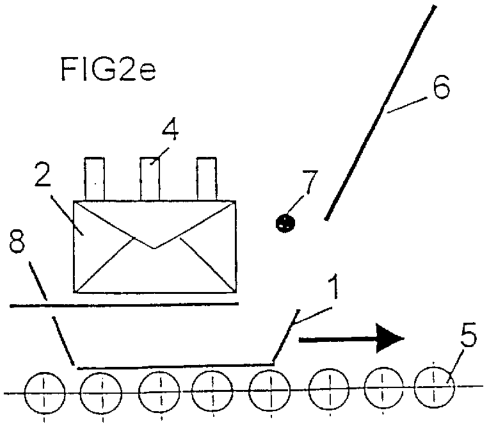

Now, according to FIG. 2*d*, mail piece stack 2, base plate 8, holding supports 4, and mail piece container 1 are tilted back, by means of the holding and positioning device, while maintaining their spatial relationships to one another, so that mail piece stack 2 is aligned horizontally with base plate 8 located under it. As indicated by the arrow, mail piece container 1 is detached from the holding and positioning device and falls down onto transport conveyor 5, which carries it away to the right (FIG. 2*e*). Base plate 8, with mail piece stack 2 clamped onto it, is at a sufficient distance from transport conveyor 5 that mail piece container 1 on the conveyor is not encumbered by base plate 8 or mail piece stack 2 while being carried off. Now, mail piece stack 2 can be carried off for further processing. This could be sorting, accomplished by a sorting device. For this purpose, mail piece stack 2 with base plate 8 is transported to the material input. After base plate 8 has been removed from beneath mail piece stack 2 and mail piece stack 2 stands directly on the material input, and after mobile separating blades are moved to the stack, holding supports 4 can be moved upwards and away so that mail piece stack 2 can be taken over by the separation blades and transported to the station where it is separated into individual units.

If mail piece container 1 is not completely full, the mail pieces are prevented from tipping and falling out of the mail piece container by a holding clamp, which is attached to the mail piece container. The holding clamp is formed in such a fashion that the pressing element can also compress the mail piece stack through it.

What is claimed is:

1. Process for unloading a mail piece container open at the top with side walls slanting toward the outside, loaded with mail pieces that stand on edge next to one another, and exhibiting gripping recesses in its opposite smaller sides, characterized by the following steps:

mail piece container is taken up by a holding and positioning device that can be tilted;

compression of the mail piece stack within the horizontally aligned mail piece container having pressing elements that are movable horizontally through the gripping recesses;

engagement of the tilting and movable holding supports next to the pressing elements from above, in order to hold the mail piece stack in compressed form, with the conveyor bands of the holding supports being driven in such a way that the segments of the conveyor band in contact with the mail pieces are motionless with respect to the mail pieces;

removal of the pressing elements from the mail piece container;

tilting of the full mail piece container with the holding supports by more than 90° around a longitudinal axis to the point that the mail piece stack can rest on the now lower side of the mail piece container;

tilting back of the mail piece container to the point that a movable and tiltable base plate can be inserted between the mail piece container and the mail piece stack;

insertion of the base plate between the mail piece container and the mail piece stack;

tilting back of the mail piece container, the base plate, and the mail piece stack to a horizontal position of the mail piece stack, while maintaining the positions of these elements with respect to one another; and detaching of the mail piece container from the holding and positioning device and removal of the mail piece container.

2. Process according to claim 1 characterized in that a check wall supports the mail piece stack when it is tilted by more than 90° from its horizontal position.

3. Process according to claim 1 characterized in that the base plate is moved with the mail piece stack, which is held by the holding supports, to the material input of a mail piece sorting station; in that the base plate is pulled away from under the mail piece stack; and in that the mail piece stack is taken over by the separating blades of the sorting station after the holding supports are retracted.

4. Device for unloading a mail piece container open at the top with side walls that slant toward the outside, which container is loaded with mail pieces that stand upright next to one another, and which container exhibits gripping recesses on its opposite narrow sides, is characterized by horizontally movable pressing elements for compressing the mail piece stack, in a horizontal base position of the mail piece container, through the gripping recesses;

movable holding supports that can be tilted, having conveyor belts that can be driven, that take over the compressed mail piece stack in the container and hold it;

a holding and positioning device, which can be tilted, for the mail piece container;

a base plate that can be tilted and moved; and a control unit, as well as sensors, for controlling the operation of the unloading device.

5. Device according to claim 4, characterized by a movable check wall for supporting the mail piece stack, once it has been tilted, when it is tilted by more than 90° from its horizontal position.

6. Device according to claim 4, characterized by a horizontally oriented transport conveyor for bringing on the mail piece container and for carrying it away.

* * * * *